United States Patent
Peters et al.

(10) Patent No.: US 9,261,054 B2
(45) Date of Patent: Feb. 16, 2016

(54) FUEL SYSTEM DIAGNOSTICS

(75) Inventors: Mark W. Peters, Wolverine Lake, MI (US); Robert Roy Jentz, Westland, MI (US); Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1000 days.

(21) Appl. No.: 13/429,120

(22) Filed: Mar. 23, 2012

(65) Prior Publication Data

US 2013/0253799 A1    Sep. 26, 2013

(51) Int. Cl.
F02M 33/02 (2006.01)
F02D 41/26 (2006.01)
F02B 37/00 (2006.01)
F02M 25/08 (2006.01)

(52) U.S. Cl.
CPC ........... F02M 25/0818 (2013.01); *Y02T 10/144* (2013.01)

(58) Field of Classification Search
CPC .......... F02M 25/0809; F02M 25/0818; F02M 25/0827
USPC .................... 123/516, 518, 519, 520, 515, 16
See application file for complete search history.

(56) References Cited

U.S. PATENT DOCUMENTS

| | | | |
|---|---|---|---|
| 5,511,529 A | 4/1996 | Blumenstock et al. | |
| 5,542,397 A | 8/1996 | Takahata et al. | |
| 6,820,467 B2* | 11/2004 | Streib | 73/49.2 |
| 6,889,667 B2* | 5/2005 | Fritz et al. | 123/520 |
| 7,044,112 B2 | 5/2006 | Andrian-Werburg et al. | |
| 7,073,376 B2 | 7/2006 | Hassdenteufel et al. | |
| 7,255,093 B2* | 8/2007 | Iihoshi et al. | 123/518 |
| 7,316,223 B2 | 1/2008 | Wakahara | |
| 2005/0178192 A1* | 8/2005 | Hassdenteufel et al. | 73/118.1 |
| 2006/0191330 A1* | 8/2006 | Hayakawa et al. | 73/118.1 |
| 2009/0266147 A1* | 10/2009 | Maegawa | 73/40.7 |
| 2010/0223984 A1* | 9/2010 | Pursifull et al. | 73/114.39 |
| 2010/0224171 A1* | 9/2010 | Peters et al. | 123/520 |
| 2013/0112176 A1* | 5/2013 | Peters et al. | 123/521 |

* cited by examiner

*Primary Examiner* — Hieu T Vo
*Assistant Examiner* — Arnold Castro
(74) *Attorney, Agent, or Firm* — Julia Voutyras; Alleman Hall McCoy Russell & Tuttle LLP

(57) ABSTRACT

Methods and systems are provided for detecting a fuel system leak. One or more of a boost pressure from a compressor and vacuum from an intake manifold is sequentially applied on a fuel tank. A leak is detected based on a subsequent change in fuel tank pressure.

20 Claims, 5 Drawing Sheets

FUEL SYSTEM DIAGNOSTICS

FIELD

The present description relates to systems and methods for identifying degradation in an emissions control system.

BACKGROUND AND SUMMARY

Vehicles may be fitted with evaporative emission control systems to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel. However, leaks in the emissions control system can inadvertently allow fuel vapor to escape to the atmosphere. Thus, various approaches are used to identify such leaks.

One example leak detection method is described by Hassdenteufel et al. in U.S. Pat. No. 7,073,376. Therein, during engine operation, fuel systems leaks are detected by applying either a negative pressure or a positive pressure on the fuel system. In particular, the fuel tank is either over-pressurized by applying positive pressure from an air pump, or under-pressurized by applying an engine intake vacuum. Based on a change in the fuel tank pressure, relative to a pressure change obtained across a reference leak/orifice, leak detection is determined. In still other approaches a vacuum pump may be used to apply a negative pressure on the fuel system for leak detection.

However, the inventors herein have identified potential issues with such an approach. To perform the leak detection routine, an air pump or a vacuum pump is operated. As such, operation of the pump may consume vehicle power and reduce fuel economy. In addition, the need for a dedicated pump increases component costs. As another example, some leaks may be masked in the presence of positive pressure while others may be masked in the presence of negative pressure. If the leak goes undetected, exhaust emissions may be degraded.

In one example, the above issues may be at least partly addressed by a method for a boosted engine. The method comprises, indicating fuel system degradation in response to a change in fuel system pressure following application of each of a positive pressure generated at a turbocharger and a negative pressure generated at an engine intake. In this way, a pump-less system is provided wherein existing engine turbocharger hardware is used to perform an engine leak test.

For example, when leak detection conditions are met while the engine is operating with boost, a positive pressure leak test may be performed. Therein, each of a regulator valve and a canister purge valve may be opened to draw a portion of the boosted intake air (compressed by a turbocharger compressor) and apply it on a fuel tank via a canister. After applying the positive pressure for a duration (e.g., until a target fuel tank pressure has been achieved), the applying of positive pressure may be discontinued, and a change in the fuel tank pressure may be monitored. If the fuel tank pressure falls from the target pressure to atmospheric pressure at a fast rate (e.g., higher than a threshold rate), then it may be determined that a leak is present in the fuel system.

However, even if the fuel tank pressure falls at a slow rate, a leak may be present but may be masked by the positive pressure. Thus, to confirm the presence of no leaks, a negative pressure leak test may also be performed. Therein, the canister purge valve may be opened to draw a portion of the engine intake manifold vacuum and apply it on the fuel tank via the canister. After applying the negative pressure for a duration (e.g., until a target fuel tank vacuum has been achieved), the applying of negative pressure may be discontinued, and a change in the fuel tank vacuum may be monitored. If the fuel tank vacuum rises from the target vacuum to atmospheric pressure at a fast rate (e.g., higher than a threshold rate), then it may be determined that a leak is present in the fuel system. In other words, positive boost pressure is opportunistically used during boosted engine operation to perform a positive pressure leak test while natural engine vacuum is opportunistically used during naturally aspirated engine vacuum conditions to perform a negative pressure leak test.

In this way, positive pressure from an existing engine turbocharger can be used to perform a positive pressure leak test. By using the boosted intake air generated by the turbocharger compressor to perform the leak test, existing hardware may be used and the need for a dedicated positive pressure pump is reduced. As such, this provides component and cost reduction benefits. By using both positive and negative pressure to determine fuel system degradation, leaks masked by the presence of positive pressure can be identified by the negative pressure leak test, while leaks masked by the presence of negative pressure can be identified by the positive pressure leak test. By improving leak detection, exhaust emissions can be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
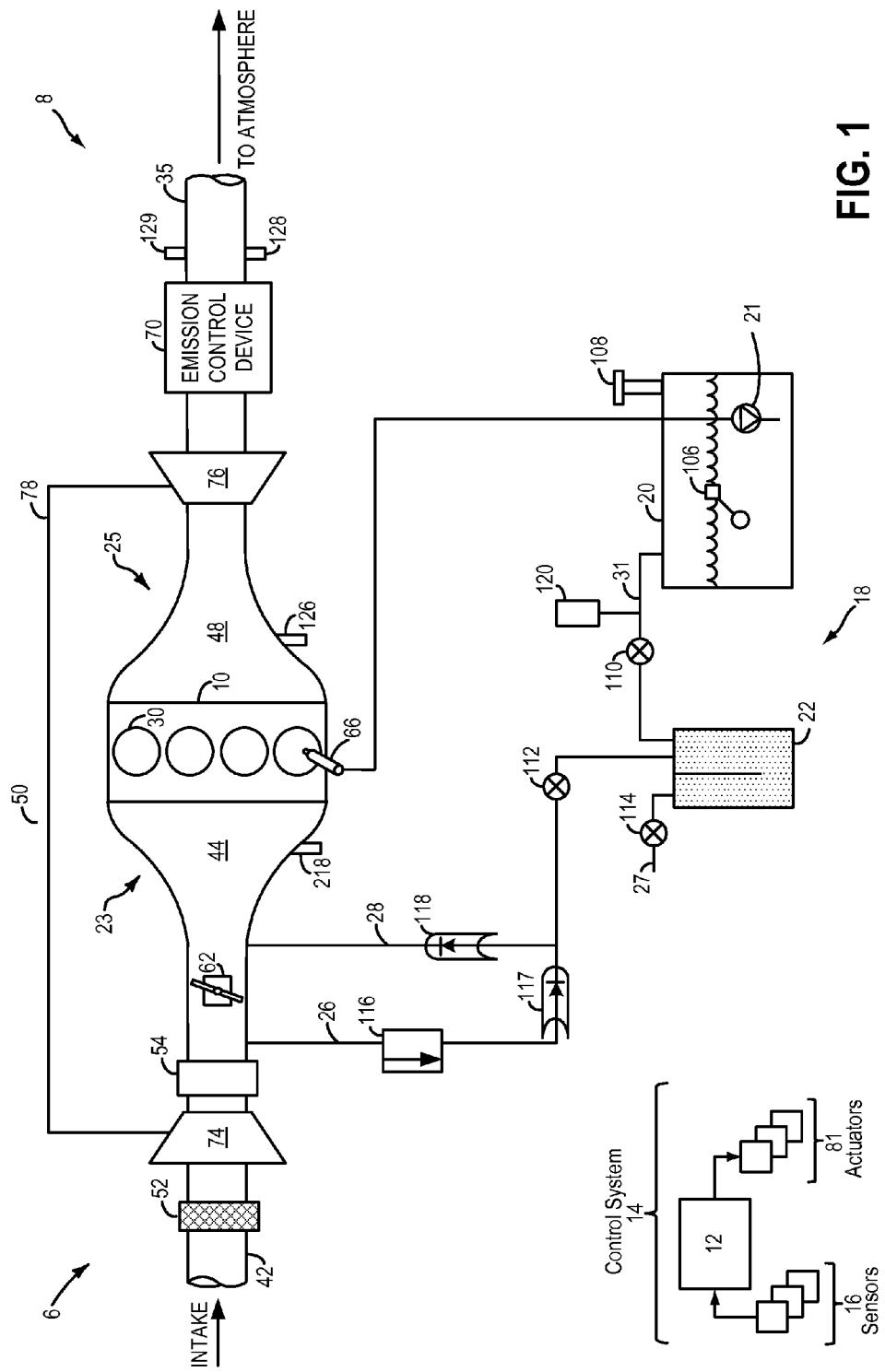
FIG. 1 shows an example layout of an engine system including a fuel system.

Methods and systems are provided for identifying leaks in a fuel system coupled to an engine, such as the fuel system of FIG. 1. A positive pressure leak test may be performed using boosted intake air generated at a turbocharger compressor while a negative pressure leak test may be performed using engine intake vacuum. A controller may be configured to perform a control routine, such as the example routine of FIG. 2, to draw boosted intake air from downstream of the compressor and apply it, for a duration, on a fuel tank via a canister to perform the positive pressure leak test while the engine is running. The controller may then draw engine intake vacuum from downstream of a throttle and apply it, for a duration, on the fuel tank via the canister to perform the negative pressure leak test while the engine is running. Based on a change in fuel tank pressure following the application of the positive or the negative pressure, a fuel system leak may be determined.

Figure 3:
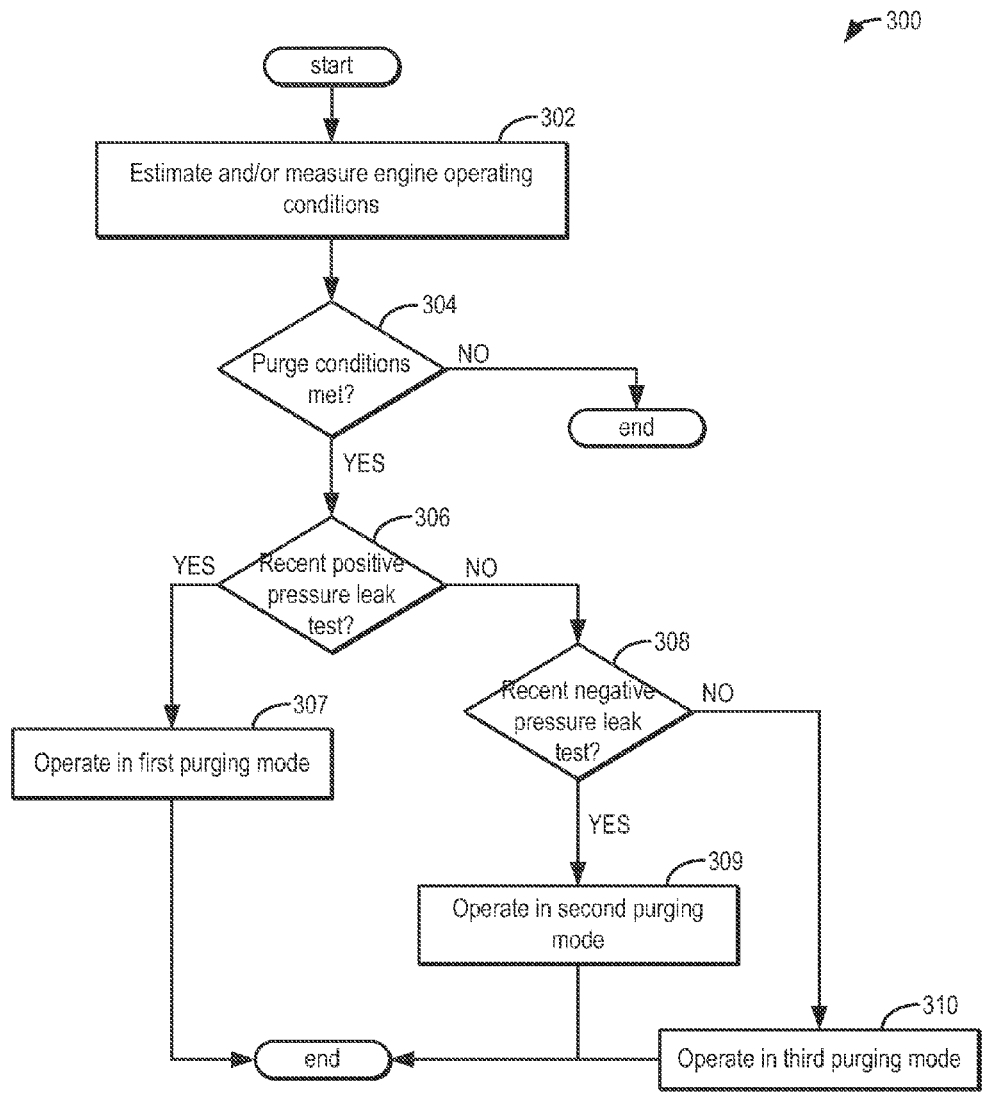
FIG. 3 shows a high level flow chart for adjusting a canister purging operation based on a preceding leak test.

The controller may also perform a control routine, such as the example routine of FIG. 3, to adjust a purging operation that follows either leak test based on the nature of the pressure (positive or negative) applied during the leak test. Example leak tests are described at FIGS. 4-5. In this way, fuel system leaks may be better identified using existing engine hardware.

FIG. 1 shows a schematic depiction of a hybrid vehicle system 6 that can derive propulsion power from engine system 8 and/or an on-board energy storage device (not shown), such as a battery system. An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein.

Engine intake 23 may further include a boosting device, such as a turbocharger 50. Turbocharger 50 includes a compressor 74 configured to draw in intake air at atmospheric air pressure and boost it to a higher pressure. Specifically, the boosted air is introduced pre-throttle (that is, upstream of throttle 62). Using the boosted intake air, a boosted engine operation may be performed. Compressor 74 may be driven by the rotation of turbine 76. Turbine 76 is coupled to compressor 74 via shaft 78 and is spun by the flow of exhaust gases through the turbine. A charge air cooler 54 may be included downstream of compressor 74 in the intake manifold for cooling the boosted aircharge delivered to the intake.

Engine system 8 is coupled to a fuel vapor system 18 (herein also referred to as fuel system 18). It will be appreciated that when fuel system is mentioned herein, it expressly means the fuel vapor system. Fuel system 18 includes a fuel tank 20 coupled to a fuel pump 21 and a fuel vapor canister 22. During a fuel tank refueling event, fuel may be pumped into the vehicle from an external source through refueling door 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be included in conduit 31 such that fuel tank 20 is coupled to canister 22 via the valve. During regular engine operation, isolation valve 110 may be kept closed to limit the amount of diurnal vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20.

One or more pressure sensors 120 may be coupled to fuel tank 20 for estimating a fuel tank pressure or vacuum level. While the depicted example shows pressure sensor 120 coupled between the fuel tank and isolation valve 110, in alternate embodiments, the pressure sensor may be coupled to fuel tank 20. In still other embodiments, a first pressure sensor may be positioned upstream of the isolation valve, while a second pressure sensor is positioned downstream of the isolation valve, to provide an estimate of a pressure difference across the valve.

Fuel vapors released from canister 22, for example during a purging operation, may be directed into engine intake manifold 44 via purge line 28 (herein also referred to as a negative pressure intake line 28). The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake.

An optional canister check valve may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) may be obtained from MAP sensor 218 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 110 while closing canister purge valve (CPV) 112 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open isolation valve 110, while maintaining canister purge valve 112 closed, to depressurize the fuel tank before allowing enabling fuel to be added therein. As such, isolation valve 110 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 112 while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Figure 2:
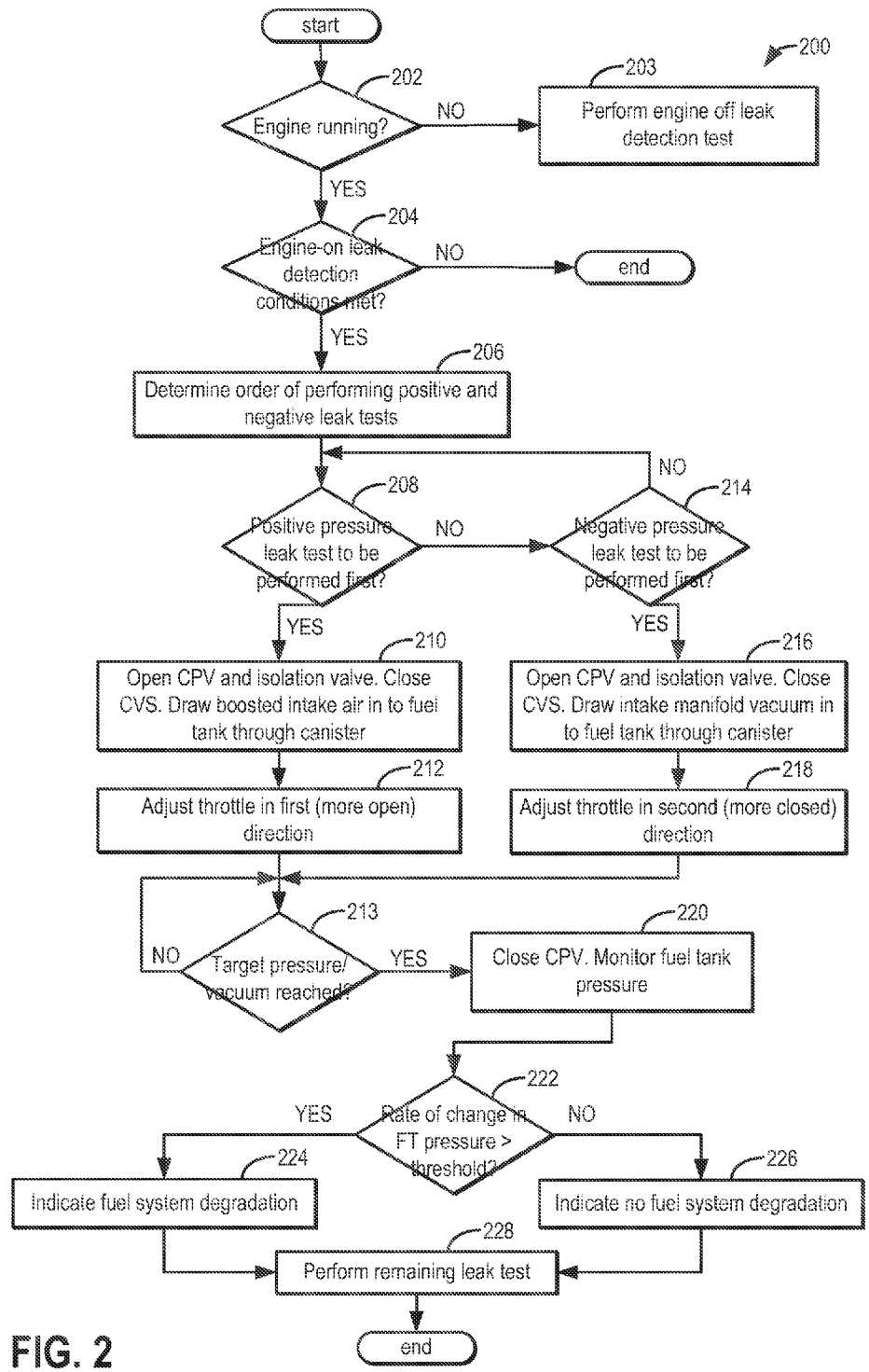
FIG. 2 shows a high level flow chart for performing a positive pressure and a negative pressure leak test on an engine fuel system.

Controller 12 may also be configured to intermittently perform leak detection routines on fuel system 18 to confirm that the fuel system is not degraded. As such, leak detection routines may be performed while the engine is off (engine-off leak test) or while the engine is running (as shown at FIG. 2). Leak tests performed while the engine is running may include applying a positive pressure on the fuel system for a duration (e.g., until a target fuel tank pressure is reached) and then sealing the fuel system while monitoring a change in fuel tank pressure (e.g., a rate of change in the pressure, or a final pressure value). Leak tests performed while the engine is running may also include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value). By performing both the positive pressure and negative pressure leak test, small leaks may be better identified since leaks masked by the application of positive pressure may be identified in the negative pressure leak test while leaks masked by the application of negative pressure may be identified in the positive pressure leak test. In one example, each of the leak tests may be performed sequentially, an order of the leak tests based on opportunity. For example, if the engine is already in boosted operation when leak test conditions are met, the positive pressure leak test may be performed before the negative pressure leak test. As another example, if the engine is already naturally aspirated when leak test conditions are met, the negative pressure leak test may be performed before the positive pressure leak test. In this way, the positive pressure leak test may be opportunistically performed during boosted engine operation while the negative pressure leak test may be opportunistically performed during naturally aspirated engine conditions.

To perform the positive pressure leak test, positive pressure generated at turbocharger 50 is applied on the fuel system. Specifically, boosted intake air may be drawn from downstream of the compressor charge air cooler 54 along positive pressure intake line 26 via regulator 116 and a first check valve 117. In this way, existing turbocharger hardware may be used to apply positive pressure for the positive pressure test, and a dedicated pump is not required. As such, regulator 116 may be configured to regulate a pressure of the boosted intake air applied to fuel tank 20. In addition, first check valve 117 may be configured to prevent fuel vapors from the canister to flow in the reverse direction. During the positive pressure leak test, canister purge valve 112 and isolation valve 110 are kept open to allow the positive pressure from the turbocharger compressor 74 to be applied on the fuel tank 20 via the canister 22. Additionally, a canister vent solenoid of canister vent valve 114 is kept closed. Then, after a threshold fuel tank positive pressure has been reached, the canister purge valve and the isolation valve may be closed while a fuel tank pressure bleed-down is monitored at pressure sensor 120. Based on the bleed-down rate and a final stabilized fuel tank pressure following the application of the positive pressure, the presence of a fuel system leak may be determined. For example, in response to a bleed-down rate that is faster than a threshold rate, a leak may be determined and fuel system degradation may be indicated.

To perform the negative pressure leak test, negative pressure generated at engine intake 23 is applied on the fuel system. Specifically, vacuum may be drawn from intake manifold 44, from downstream of the intake throttle 62, along negative pressure intake line 28 via second check valve 118. Positive pressure intake line 26 of the fuel system merges with negative pressure intake line 28 at a point upstream of the canister purge valve 112. During the negative pressure leak test, canister purge valve 112 and isolation valve 110 are kept open to allow the negative pressure from the engine intake to be applied on the fuel tank 20 via the canister 22. Additionally, a canister vent solenoid of canister vent valve 114 is kept closed. Then, after a threshold fuel tank negative pressure has been reached, the canister purge valve and the isolation valve may be closed while a fuel tank pressure bleed-up is monitored at pressure sensor 120. Based on the bleed-up rate and the final stabilized fuel tank pressure following the application of the negative pressure, the presence of a fuel system leak may be determined. For example, in response to a bleed-up rate that is faster than a threshold rate, a leak may be determined and fuel system degradation may be indicated.

The isolation valve 110 may also be opened at the onset of a leak detection routine to allow a positive pressure (from the turbocharger) or a negative pressure (from the engine intake) to be applied on the fuel tank. Following application of the positive or negative pressure, the isolation valve may be closed to isolate the fuel tank from the engine intake and allow the change in fuel tank pressure (e.g., a bleed-down rate of fuel tank pressure or a bleed-up rate of fuel tank vacuum) to be monitored to identify a leak in the fuel tank. Isolation valve 110 may be a solenoid valve wherein operation of the valve may be regulated by adjusting a driving signal (or pulse width) of the dedicated solenoid. In still other embodiments, fuel tank 20 may also be constructed of material that is able to structurally withstand high fuel tank pressures, such as fuel tank pressures that are higher than a threshold and below atmospheric pressure.

It will be appreciated that the fuel system may be operated in various purging modes based on whether a canister purging operation occurred after pressure was applied for leak testing, and further based on the nature of the applied pressure. For example, the controller may operate the fuel system in a first purging mode if a purging operation occurs immediately after a positive pressure was applied for a positive pressure leak test. Herein, the controller may increase the duration of the purging to compensate for fuel vapors that may have been pushed out of the canister into the fuel tank during the leak test. As another example, the controller may operate the fuel system in a second purging mode if a purging operation occurs immediately after a negative pressure was applied for a negative pressure leak test. Herein, the controller may decrease the duration of the purging to compensate for fuel vapors that may have been purged from the canister to the engine intake during the leak test. If neither positive nor negative pressure was applied to the fuel tank immediately before the purging, the controller may operate the fuel system in a third (e.g., default) purging mode wherein the purge flow rate and duration is based on the canister load and engine operating conditions.

Returning to FIG. 1, vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include fuel injector 66, compressor 74, isolation valve 110, purge valve 112, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 2-3.

In this way, the system of FIG. 1 enables a method for a boosted engine wherein fuel system degradation is indicated in response to a change in fuel system pressure following application of each of a positive pressure generated at a turbocharger and a negative pressure generated at an engine intake. Specifically, each of the positive and negative pressures are applied to a fuel tank of the fuel system through a canister.

Now turning to FIG. 2, an example routine 200 is shown for sequentially applying positive and negative pressure on a fuel system and identifying a fuel system leak based on a change in fuel system pressure following the application of the positive or negative pressure.

At 202, it may be confirmed that the engine is running. If the engine is not running, then at 203, an engine off leak detection test may be performed. Therein, the natural vacuum generated due to a drop in engine system and fuel tank temperature following an engine being turned off may be applied on the fuel tank and a change in fuel tank pressure may be monitored to identify a leak. Specifically, if a fuel tank pressure bleed-up rate (from the vacuum level) while the engine is off is higher than a threshold, a fuel system leak may be determined.

Upon confirming engine running, at 204, it may be confirmed that engine-on leak detection conditions have been met. These may include, for example, confirming that a threshold duration has elapsed since the most recent engine-on leak test. Upon confirming that leak testing conditions have been met, at 206, an order of performing the positive and negative pressure leak tests may be determined. In one example, an order of performing the leak tests sequentially may be based on opportunity. Performing the leak tests based on opportunity includes performing the positive pressure leak test opportunistically during boosted engine operation while performing the negative pressure leak test opportunistically during naturally aspirated engine conditions. For example, sequentially applying each of a positive pressure (from a turbocharger compressor) and a negative pressure (from an engine intake) on the fuel tank may include during a first condition, when the engine is in boosted engine operation when leak detection conditions are met, applying positive pressure on the fuel tank via the canister before applying negative pressure on the fuel tank via the canister, and monitoring a rate of change in fuel tank pressure following application of the positive or negative pressure. Then, during a second condition, when the engine is not in boosted engine operation when leak detection conditions are met, the sequentially applying includes applying negative pressure on the fuel tank via the canister before applying positive pressure on the fuel tank via the canister, and monitoring a rate of change in fuel tank pressure following application of the positive or negative pressure.

At 208, it may be confirmed if the positive pressure leak test is to be performed before the negative pressure leak test. If yes, then at 210, the routine includes drawing boosted intake air from downstream of a compressor charge air cooler to the fuel tank (through the canister) via a regulator and a first check valve. In one example, the controller may operate the fuel system in a first mode with the canister purge valve open to draw boosted intake air and perform the positive pressure leak test. As such, during the application of the positive pressure, the canister purge valve (CPV) and the isolation valve are maintained open while a canister vent solenoid (CVS) of the canister vent valve is maintained closed. Next at 212, while applying the positive pressure, the intake throttle position may be adjusted in a first direction. Specifically, the intake throttle may be adjusted towards a more open position. Herein, by opening the throttle more while boosted intake air is drawn from downstream of the compressor, a transient change in the engine intake air level may be compensated for.

In one example, the positive pressure may be applied for a duration until a target fuel tank pressure is achieved. Accordingly, at 213, it may be determined if the target pressure has been reached. If the target pressure has not been reached, the positive pressure may continue to be applied until the target pressure is reached. Once the target pressure has been reached, at 220, the canister purge valve may be closed to seal the fuel system.

Additionally, at 220, the fuel system pressure may be monitored. In one example, the fuel system pressure is a fuel tank pressure estimated by a pressure sensor coupled between the fuel tank and the canister. Monitoring the fuel system pressure may include monitoring a rate of change in the fuel tank pressure and/or monitoring a stabilized fuel tank pressure following the application of the positive pressure. In particular, after the target fuel tank pressure is reached, the fuel tank may be isolated from the positive pressure. For example, the canister purge valve may be closed to isolate the fuel tank. Additionally, the isolation valve may be maintained open while the canister vent solenoid of the canister vent valve is maintained closed. Following isolation of the fuel tank, the fuel tank pressure may be expected to equilibrate back towards atmospheric pressure at a defined rate (based on a reference orifice size). If a leak is present, the fuel tank pressure may be expected to bleed-down to the atmospheric pressure at a faster rate.

Accordingly, at 222, a rate of change in the fuel tank pressure may be determined and compared to a threshold rate. If the rate of change in fuel tank pressure is larger than the threshold, that is, if following application of the positive pressure, the drop in fuel tank pressure is larger than a threshold, then at 224, fuel system degradation may be determined. As used herein, the rate of change may be an absolute rate of change in the fuel tank (positive) pressure. Fuel system degradation may be indicated by setting a diagnostic code (e.g., by setting a malfunction indication light). In comparison, if the rate of change in fuel tank pressure is smaller than the threshold, no fuel system degradation (based on the positive pressure test) may be determined.

As such, there may be conditions where even though a leak is present, the presence of positive pressure can mask the leak. Thus, even if fuel system degradation is not determined, at 228, the routine may proceed to confirm the presence of no leaks by performing the other leak test. In the case, where the first test that was performed was the positive pressure test, at 228, the routine may include proceeding to perform the negative pressure leak test, as described below.

Returning to 208, if the positive pressure leak test is not the first test to be performed, then at 214, it may be confirmed that the negative pressure leak test is the first test to be performed. Accordingly, at 216, the routine includes drawing vacuum from the engine intake manifold, downstream of the intake throttle, to the fuel tank (through the canister) via a second check valve. In one example, the controller may operate the fuel system in a second mode with the canister purge valve open to draw the boosted intake air and perform the negative pressure leak test. As such, during the application of the negative pressure, the canister purge valve and the isolation valve are maintained open while a canister vent solenoid of the canister vent valve is maintained closed. Next at 218, while applying the negative pressure, the intake throttle position may be adjusted in a second direction opposite the first direction. Specifically, the intake throttle may be adjusted towards a more closed position. Herein, by closing the throttle more while vacuum is drawn from downstream of the throttle, a transient change in the engine air level may be compensated for.

In one example, the negative pressure may be applied for a duration until a target fuel tank vacuum is achieved. Accordingly, at 213, it may be determined if the target vacuum has been reached. If the target vacuum has not been reached, the negative pressure may continue to be applied until the target vacuum is reached. Once the target vacuum has been achieved, at 220, the canister purge valve may be closed to seal the fuel system.

At 220, the fuel system pressure, such as a fuel tank pressure, may be monitored. As elaborated above, monitoring the fuel system pressure may include monitoring a rate of change in the fuel tank pressure and/or monitoring a stabilized fuel tank pressure following the application of the negative pressure. In particular, after the target fuel tank vacuum is reached, the fuel tank may be isolated from the negative pressure. For example, the canister purge valve and the isolation valve may be closed to isolate the fuel tank. Following isolation of the fuel tank, the fuel tank pressure may be expected to equilibrate back towards atmospheric pressure at a defined rate (based on a reference orifice size). If a leak is present, the fuel tank pressure may be expected to bleed-up to the atmospheric pressure at a faster rate.

Accordingly, at 222, a rate of change in the fuel tank pressure may be determined and compared to a threshold rate. If the rate of change in fuel tank pressure is larger than the threshold, that is, if following application of the negative pressure, the drop in fuel tank vacuum is larger than the threshold, then at 224, fuel system degradation may be determined. As used herein, the rate of change may be an absolute rate of change in the fuel tank (negative) pressure. Fuel system degradation may be indicated by setting a diagnostic code (e.g., by setting a malfunction indication light). In comparison, if the rate of change in fuel tank pressure is smaller than the threshold, no fuel system degradation (based on the positive pressure test) may be determined.

As such, there may be conditions where even though a leak is present, the presence of negative pressure can mask the leak. Thus, even if fuel system degradation is not determined, at 228, the routine may proceed to confirm the presence of no leaks by performing the other leak test. In the case, where the first test that was performed was the negative pressure test, at 228, the routine may include proceeding to perform the positive pressure leak test, as described above.

It will be appreciated that a fuel system leak may be confirmed if either of the positive pressure or negative pressure leak test indicates fuel system degradation. Further, while the depicted example shows fuel system degradation indicated in response to a rate of change in fuel tank pressure being larger than a threshold (following application of either the positive or negative pressure), in other embodiments, the fuel tank pressure may be allowed to stabilize and the stabilized pressure value may be compared to a reference value, such as a value obtained with a reference orifice. Therein, following the application of the positive pressure, if the stabilized fuel tank pressure value is at or above the reference value, no fuel system degradation may be determined, while a fuel system leak may be indicated if the stabilized fuel tank pressure is below the reference value. Alternatively, following the application of the negative pressure, if the stabilized fuel tank pressure value is at or below the reference value, no fuel system degradation may be determined, while a fuel system leak may be indicated if the stabilized fuel tank pressure is above the reference value.

As further elaborated with reference to FIG. 3, a canister purging operation of the fuel system may be adjusted if it is immediately preceded by a leak test, the adjustment based on whether positive pressure or negative pressure was applied on the fuel tank through the canister during the immediately preceding leak test. As such, fuel tank vapors may be either drawn out of the canister into the intake manifold or pushed out of the canister into the fuel tank based on the nature of the pressure applied during the leak test. Thus, a duration and/or flow rate of the purging operation may be adjusted based on whether positive or negative pressure was applied during the leak test immediately preceding the purging operation.

In this way, each of a positive pressure from a turbocharger compressor and a negative pressure from an engine intake may be sequentially applied on a fuel tank, and fuel system degradation may be determined based on a fuel tank pressure following application of the positive or negative pressure.

Now turning to FIG. 3, an example routine 300 is shown for adjusting a purging operation based on whether a leak test was performed immediately before the purging request, and further based on the nature of the pressure (positive or negative pressure) that was applied on the fuel system during the leak test.

At 302, engine operating conditions may be estimated and/or measured. These may include, for example, engine speed-load conditions, canister load, engine temperature, exhaust catalyst temperature, boost level, barometric pressure, etc. At 304, purge conditions may be confirmed. For example, purge conditions may be confirmed if a canister load is higher than a threshold, if a threshold duration has elapsed since a last canister purge, and an exhaust catalyst temperature is higher than a light-off temperature. If purge conditions are not confirmed, the routine may end.

Upon confirming purge conditions, at 306, it may be determined if a positive pressure leak test was recently performed. For example, it may be determined if a positive pressure leak test was performed immediately before the purge conditions were met wherein boosted intake air was drawn from downstream of a compressor charge air cooler into the fuel tank via the canister. As such, if a positive pressure was applied on the fuel tank via the canister during the immediately preceding leak test, then fuel vapors stored in the canister may have been forced into the fuel tank, and those fuel vapors may need to be re-absorbed in the canister and purged into the engine. Thus, if the immediately preceding leak test was a positive pressure leak test, then at 307, the controller may operate the fuel system in a first purging mode. Therein, when the purging is performed after the application of positive pressure on the fuel system, the purging is continued for a longer duration to compensate for the fuel vapors that may have been pushed out of the canister into the fuel tank and which may need to be drawn back out.

If a recent positive pressure leak test is not confirmed at 306, then at 308, it may be determined if a negative pressure leak test was recently performed. For example, it may be determined if a negative pressure leak test was performed immediately before the purge conditions were met wherein intake manifold vacuum was drawn from downstream of an intake throttle into the fuel tank via the canister. As such, if a negative pressure was applied on the fuel tank via the canister during the immediately preceding leak test, then fuel vapors stored in the canister may have been drawn into the engine intake manifold during the leak test, and those fuel vapors may not need to be re-purged into the engine. Thus, if the immediately preceding leak test was a negative pressure leak test, then at 309, the controller may operate the fuel system in a second purging mode. Therein, when the purging is performed after the application of negative pressure on the fuel system, the purging is continued for a shorter duration to compensate for the fuel vapors that may have been already pulled out of the canister during the leak test.

If a recent negative pressure leak test is not confirmed at 308, then at 310, the routine includes operating the fuel system in a third purging mode in response to neither leak test being performed immediately before the purging operation. Herein, a purge flow rate and a duration of purging may be adjusted based only the estimated operating conditions, such as the estimated canister load, the engine speed-load condition, etc. In one example, the third purging mode may be a default purging mode that is used during purging operations. The controller may be configured to shift purging modes from the default third mode to either the first or second purging mode based on whether a leak test was recently performed and further based on whether positive or negative pressure was applied on the fuel system during that leak test.

It will be appreciated that while the above example illustrates increasing a purging duration in response to a positive pressure being applied prior to the purging while decreasing a purging duration in response to a negative pressure being applied prior to the purging, in alternate embodiments, the controller may be configured to decrease a purging duration in response to a positive pressure being applied prior to the purging while increasing a purging duration in response to a negative pressure being applied prior to the purging. For example, during the second purging mode, the application of negative pressure on the fuel tank may draw additional fuel tank vapors into the canister and increase the canister load. Thus, the purging duration during the second purging mode may be increased to compensate for the additional canister load.

In this way, by adjusting a purging operation immediately following a leak test based on the nature of pressure applied, canister purging may be improved and better coordinated with fuel system leak tests.

Figure 4:
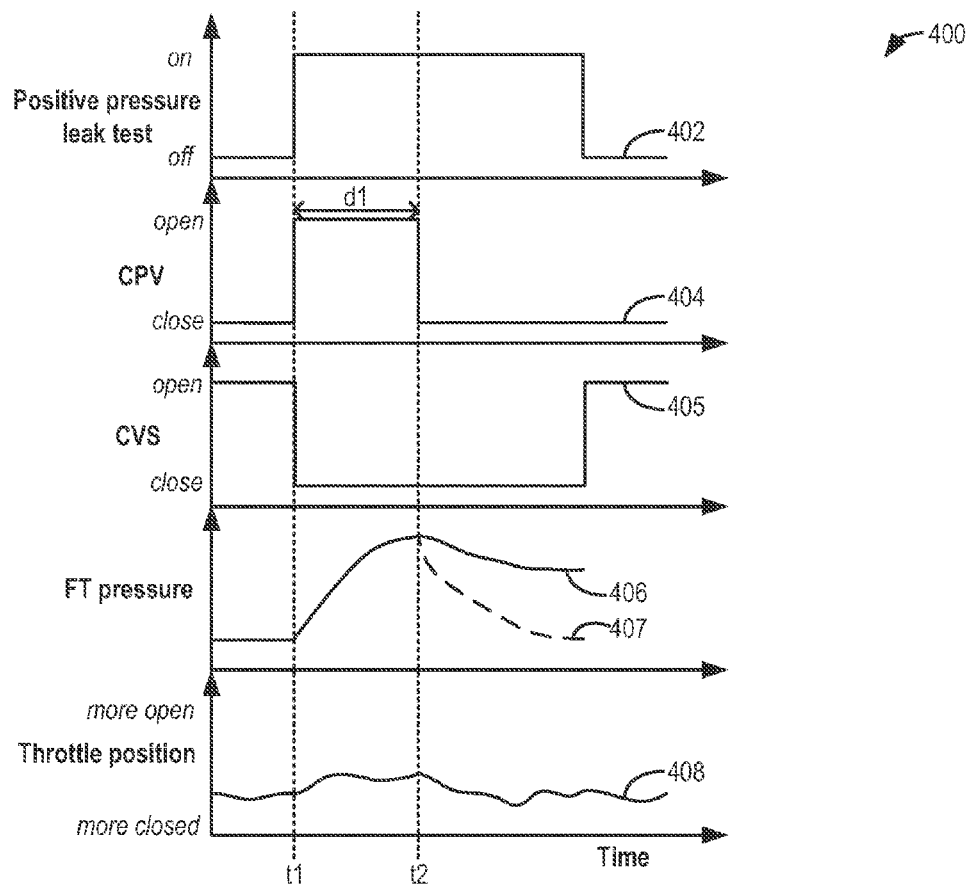
FIGS. 4-5 show example positive pressure and negative pressure leak tests.

Now turning to FIG. 4, an example positive pressure leak test is shown at map 400. Specifically, an indication of when the leak test is running is provided at graph 402, an indication of the (open or close) status of the canister purge valve (CPV) is provided at graph 404, an indication of the (open or close) status of the canister vent solenoid (CVS) coupled to the canister vent valve is provided at graph 405, changes in fuel tank pressure following application of the positive pressure is shown at graphs 406 and 407, and a throttle position is shown at graph 408. All graphs are plotted over time along the x-axis.

Before t1, the engine may be running with the CPV closed and the canister vent solenoid open and no leak test being performed. At t1, leak test conditions may be met and a positive pressure leak test may be initiated (graph 402). Accordingly, the CPV may be opened (graph 404) for a duration d1 (from t1 to t2) during which positive pressure (or boosted intake air) is drawn from downstream of the compressor charge air cooler and applied on the fuel tank via the canister. During this time, the fuel tank pressure gradually increases until a target fuel tank pressure is reached at t2 (graph 406). At this point (at t2), the CPV is closed to isolate the fuel tank from the applied positive pressure. Additionally, during the positive pressure leak test, an isolation valve may be opened (not shown) while a canister vent solenoid of the canister vent valve is maintained closed for the entire duration of the leak test (graph 405). Between t1 and t2, while boosted intake air is applied on the fuel tank, the throttle position may be adjusted towards a more open position to allow the engine aircharge level to be maintained. Thereafter (after t2), the original throttle position may be resumed.

At t2, after closing the CPV, a change in the fuel tank pressure following the application of the positive pressure is monitored. In the depicted example, a rate of bleed-down of fuel tank pressure (towards atmospheric pressure) is monitored. In the absence of a leak, the fuel tank pressure may bleed down at a slower rate (e.g., slower than a threshold rate), and stabilize at a higher pressure value (e.g., at or above a reference value), as shown by graph 406 (solid line). However, in the presence of a leak, the pressure may bleed down at a faster rate (e.g., faster than a threshold rate), and stabilize at a lower pressure value (e.g., below a reference value), as shown by graph 407 (dashed line). In response to a leak being detected, fuel system degradation is indicated by setting a diagnostic code.

Figure 5:
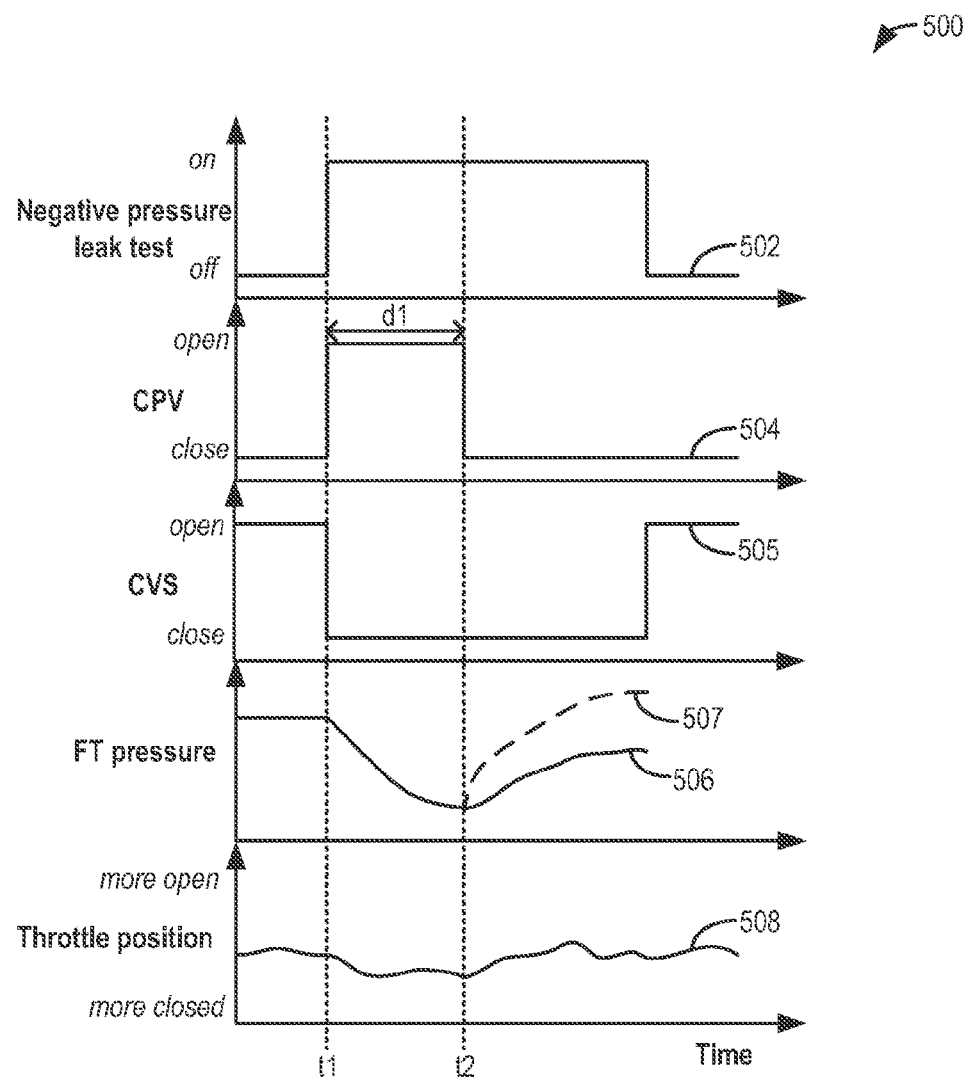

Now turning to FIG. 5, an example negative pressure leak test is shown at map 500. Specifically, an indication of when the leak test is running is provided at graph 502, an indication of the (open or close) status of the canister purge valve (CPV) is provided at graph 504, an indication of the (open or close) status of the canister vent solenoid (CVS) coupled to the canister vent valve is provided at graph 505, changes in fuel tank vacuum following application of the negative pressure is shown at graphs 506 and 507, and a throttle position is shown at graph 508. All graphs are plotted over time along the x-axis.

Before t1, the engine may be running with the CPV closed and the canister vent solenoid open and no leak test being performed. At t1, leak test conditions may be met and a negative pressure leak test may be initiated (graph 502). Accordingly, the CPV may be opened (graph 504) for a duration d1 (from t1 to t2) during which negative pressure (or vacuum) is drawn from the engine intake manifold, downstream of an intake throttle, and applied on the fuel tank via the canister. During this time, the fuel tank pressure gradually decreases until a target fuel tank vacuum is reached at t2 (graph 506). At this point (at t2), the CPV is closed to isolate the fuel tank from the applied negative pressure. Additionally, during the negative pressure leak test, an isolation valve may be opened (not shown) while a canister vent solenoid of the canister vent valve is maintained closed for the entire duration of the leak test (graph 505). Between t1 and t2, while intake vacuum is applied on the fuel tank, the throttle position may be adjusted towards a more closed position to allow the engine aircharge level to be maintained. Thereafter (after t2), the original throttle position may be resumed.

At t2, after closing the CPV, a change in the fuel tank pressure following the application of the negative pressure is monitored. In the depicted example, a rate of bleed-up of fuel tank pressure (towards atmospheric pressure) is monitored. In the absence of a leak, the fuel tank pressure may bleed up at a slower rate (e.g., slower than a threshold rate), and stabilize at a lower pressure value (e.g., at or below a reference value), as shown by graph 506 (solid line). However, in the presence of a leak, the pressure may bleed up at a faster rate (e.g., faster than a threshold rate), and stabilize at a higher pressure value (e.g., above a reference value), as shown by graph 507 (dashed line). In response to a leak being detected, fuel system degradation is indicated by setting a diagnostic code.

In this way, existing engine hardware can be used to perform a fuel system leak test. Specifically, positive pressure generated at an existing engine turbocharger compressor can be opportunistically used to perform a positive pressure leak test, reducing the need for a dedicated positive pressure pump. By using the existing components, a pump-less leak detection system may be provided. As such, this provides component and cost reduction benefits. By sequentially applying each of positive and negative pressure on a fuel tank, leaks masked by the application of positive pressure can be identified by the negative pressure leak test, while leaks masked by the application of negative pressure can be identified by the positive pressure leak test. By improving leak detection, exhaust emissions can be improved.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and nonobvious combinations and subcombinations of the various systems and configurations, and other features, functions, and/or properties disclosed herein.

The invention claimed is:

1. A method for a boosted engine, comprising:
   indicating fuel vapor system degradation in response to a change in fuel vapor system pressure following application of each of a positive pressure generated at a turbocharger and a negative pressure generated at an engine intake.

2. The method of claim 1, wherein each of the positive and negative pressures are applied through a canister to a fuel tank of the fuel vapor system.

3. The method of claim 2, wherein application of positive pressure on the fuel vapor system includes drawing boosted intake air from downstream of a compressor charge air cooler to the fuel tank via a regulator and a first check valve.

4. The method of claim 3, wherein application of negative pressure on the fuel vapor system includes drawing vacuum from an engine intake manifold, downstream of an intake throttle, to the fuel tank via a second check valve.

5. The method of claim 4, wherein the canister is coupled to the intake manifold via a canister purge valve, and wherein a positive pressure intake line of the fuel vapor system merges with a negative pressure intake line of the fuel vapor system upstream of the canister purge valve.

6. The method of claim 5, wherein during application of each of the positive pressure and the negative pressure, the canister purge valve is maintained open.

7. The method of claim 6, wherein indicating fuel vapor system degradation includes,
   following application of the positive pressure, indicating degradation in response to a drop in fuel tank pressure being faster than a threshold; and following application of the negative pressure, indicating degradation in response to a drop in fuel tank vacuum being faster than a threshold.

8. The method of claim 7, wherein indicating degradation includes setting a diagnostic code.

9. The method of claim 4, further comprising, purging fuel vapors from the canister to the engine intake manifold following the application of positive or negative pressure, a duration of the purging adjusted based on whether positive or negative pressure was applied.

10. The method of claim 9, wherein the purging is continued for a shorter duration when the purging is performed after the application of negative pressure on the fuel vapor system, and wherein the purging is continued for a longer duration when the purging is performed after the application of positive pressure on the fuel vapor system.

11. The method of claim 4, further comprising,
while applying the positive pressure, adjusting an intake throttle position in a first direction; and
while applying the negative pressure, adjusting the intake throttle position in a second, opposite direction.

12. An engine method, comprising:
sequentially applying each of a positive pressure from a turbocharger compressor and a negative pressure from an engine intake on a fuel tank; and
indicating fuel vapor system degradation based on a fuel tank pressure following application of the positive or negative pressure.

13. The method of claim 12, wherein the sequentially applying includes,
during a first condition, applying positive pressure on the fuel tank via a canister before applying negative pressure on the fuel tank via the canister, and monitoring a rate of change in fuel tank pressure following application of the positive or negative pressure; and
during a second condition, applying negative pressure on the fuel tank via the canister before applying positive pressure on the fuel tank via the canister, and monitoring a rate of change in fuel tank pressure following application of the positive or negative pressure.

14. The method of claim 13, wherein the indicating includes, during each of the first and second conditions, indicating a fuel vapor system leak based on the rate of change in fuel tank pressure being larger than a threshold.

15. The method of claim 13, wherein applying positive pressure on the fuel tank includes drawing boosted intake air from downstream of a compressor charge air cooler to the fuel tank via a regulator and the canister, and wherein applying negative pressure on the fuel tank includes drawing vacuum from an engine intake manifold, downstream of an intake throttle, to the fuel tank via the canister.

16. An engine system, comprising:
an engine with an intake manifold and an exhaust manifold;
a turbocharger compressor coupled to a charge air cooler;
a fuel vapor system including a fuel tank coupled to a canister, the canister coupled to the intake manifold via a canister purge valve;
a pressure sensor coupled to the fuel vapor system for estimating a fuel vapor system pressure; and
a controller with computer readable instructions for,
operating the fuel vapor system in a first mode with the canister purge valve open to draw boosted intake air from downstream of the charge air cooler into the fuel tank via the canister;
operating the fuel vapor system in a second mode with the canister purge valve open to draw intake manifold vacuum from downstream of a throttle into the fuel tank via the canister; and
during each of the first and second modes, indicating fuel vapor system degradation based on a rate of change in fuel system pressure following the drawing of intake air or vacuum.

17. The system of claim 16, wherein indicating fuel vapor system degradation includes, indicating a fuel system leak in response to an absolute rate of change in the fuel vapor system pressure being larger than a threshold.

18. The system of claim 16, wherein the fuel system pressure is a fuel tank pressure, and wherein the pressure sensor is coupled between the fuel tank and the canister.

19. The system of claim 16, wherein the controller includes further instructions for,
opening the canister purge valve to purge the canister for a first, longer duration after operating in the first mode; and
opening the canister purge valve to purge the canister for a second, shorter duration after operating in the second mode.

20. The system of claim 16, wherein the controller includes further instructions for,
adjusting the throttle towards a more open position when operating in the first mode; and
adjusting the throttle towards a more closed position when operating in the second mode.

* * * * *